(12) United States Patent
Linsky et al.

(10) Patent No.: US 9,024,865 B2
(45) Date of Patent: May 5, 2015

(54) METHOD AND APPARATUS FOR CONTROLLING MOBILE AND CONSUMER ELECTRONIC DEVICES

(75) Inventors: Joel Benjamin Linsky, San Diego, CA (US); Oliver Michaelis, San Diego, CA (US); Manuel Eduardo Jaime, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 987 days.

(21) Appl. No.: 12/722,640

(22) Filed: Mar. 12, 2010

(65) Prior Publication Data

US 2011/0018794 A1    Jan. 27, 2011

Related U.S. Application Data

(60) Provisional application No. 61/228,119, filed on Jul. 23, 2009.

(51) Int. Cl.
*G09G 5/00*   (2006.01)
*G06F 1/16*   (2006.01)
(Continued)

(52) U.S. Cl.
CPC ............... *G06F 1/163* (2013.01); *G06F 3/011* (2013.01); *G06F 3/017* (2013.01); *G06F 3/0346* (2013.01); *G06F 3/038* (2013.01)

(58) Field of Classification Search
USPC ................................ 345/156, 179; 455/569.1
See application file for complete search history.

(56) References Cited

U.S. PATENT DOCUMENTS 5,251,326 A   10/1993   Silverman
5,489,922 A   2/1996    Zloof
(Continued)

FOREIGN PATENT DOCUMENTS

CN   1677318 A   10/2005
CN   1856052 A   11/2006
(Continued)

OTHER PUBLICATIONS

International Search Report and Written Opinion—PCT/US2010/043148—International Search Authority, European Patent Office,Oct. 27, 2010.
(Continued)

*Primary Examiner* — Yong H Sim
(74) *Attorney, Agent, or Firm* — Paul S. Holdaway

(57) ABSTRACT

Various methods for controlling a device is disclosed including dynamically selecting a set of mappings defining how a gesture made by a movement of at least one wearable item will be interpreted as one or more commands; determining whether the gesture has a mapping in the set of mappings; and translating the gesture into a command for the device based on the determination. Interpreting movements of a wearable item as gestures associated with a command to control a controlled device is also disclosed that includes sensing a movement of the wearable item in context as being indicative of a gesture relating to the command based on the first context. A method for communicating control information by a wearable device is further disclosed including determining an agreed upon set of control gestures between first and second devices, wherein the control gestures are performable using the first device and are supportable by the second device; and participating in a control sequence to control the second device via a wireless transmission corresponding to at least one of the control gestures to be performed using the first device.

43 Claims, 14 Drawing Sheets

(51) Int. Cl.
*G06F 3/01* (2006.01)
*G06F 3/0346* (2013.01)
*G06F 3/038* (2013.01)

(56) References Cited

U.S. PATENT DOCUMENTS

| | | | |
|---|---|---|---|
| 7,148,879 B2 | 12/2006 | Amento et al. | |
| 7,215,319 B2 * | 5/2007 | Kamijo et al. | 345/156 |
| 7,301,526 B2 | 11/2007 | Marvit et al. | |
| 2002/0027547 A1 | 3/2002 | Kamijo et al. | |
| 2002/0083025 A1 | 6/2002 | Robarts et al. | |
| 2003/0208335 A1 | 11/2003 | Unuma et al. | |
| 2006/0004680 A1 | 1/2006 | Robarts et al. | |
| 2006/0028429 A1 * | 2/2006 | Kanevsky et al. | 345/156 |
| 2008/0033259 A1 | 2/2008 | Manto et al. | |
| 2008/0059138 A1 | 3/2008 | Tremblay et al. | |
| 2008/0059578 A1 | 3/2008 | Albertson et al. | |
| 2008/0129694 A1 | 6/2008 | Haven | |
| 2008/0150898 A1 * | 6/2008 | Low et al. | 345/166 |
| 2008/0174547 A1 * | 7/2008 | Kanevsky et al. | 345/156 |
| 2009/0051648 A1 * | 2/2009 | Shamaie et al. | 345/156 |
| 2010/0124949 A1 * | 5/2010 | Demuynck et al. | 455/569.1 |
| 2010/0259472 A1 * | 10/2010 | Radivojevic et al. | 345/156 |
| 2011/0007035 A1 | 1/2011 | Shai | |
| 2011/0018731 A1 | 1/2011 | Linsky et al. | |
| 2011/0022196 A1 | 1/2011 | Linsky et al. | |

FOREIGN PATENT DOCUMENTS

| | | |
|---|---|---|
| CN | 1996208 A | 7/2007 |
| CN | 101141611 A | 3/2008 |
| CN | 101329600 A | 12/2008 |
| CN | 101334698 A | 12/2008 |
| CN | 101371216 A | 2/2009 |
| CN | 101430601 A | 5/2009 |
| CN | 101464746 A | 6/2009 |
| CN | 101477636 A | 7/2009 |
| CN | 101491067 A | 7/2009 |
| CN | 101795831 A | 8/2010 |
| JP | H07248873 A | 9/1995 |
| JP | 2001159951 A | 6/2001 |
| JP | 2002041235 A | 2/2002 |
| JP | 2002361576 A | 12/2002 |
| JP | 2005352739 A | 12/2005 |
| JP | 2006526844 A | 11/2006 |
| JP | 2007531113 A | 11/2007 |
| JP | 2008176779 A | 7/2008 |
| JP | 2008530661 A | 8/2008 |
| JP | 2010511960 A | 4/2010 |
| JP | 2010537302 A | 12/2010 |
| WO | WO0175654 | 10/2001 |
| WO | WO-2004099903 A2 | 11/2004 |
| WO | WO-2005103863 A2 | 11/2005 |
| WO | WO-2006086508 A2 | 8/2006 |
| WO | WO-2008010103 A1 | 1/2008 |
| WO | WO2008069577 | 6/2008 |
| WO | WO2009024971 | 2/2009 |

OTHER PUBLICATIONS

Cao X., "An exploration of gesture-based interaction", Thesis for the degree of Master of Science, University of Toronto, 2004.

* cited by examiner

United States Patent

METHOD AND APPARATUS FOR CONTROLLING MOBILE AND CONSUMER ELECTRONIC DEVICES

CLAIM OF PRIORITY UNDER 35 U.S.C. §119

The present application for patent claims priority to Provisional Application No. 61/228,119, entitled "Method and Apparatus for Distributed User Interfaces to Control Mobile and Consumer Electronic Devices" filed Jul. 23, 2009, and assigned to the assignee hereof and hereby expressly incorporated by reference herein.

BACKGROUND

1. Field

Certain aspects of the present disclosure generally relate to controlling a device via wireless communications.

2. Background

As mobile, computing, and consumer electronic devices continue to expand their capabilities, the mechanisms for the user to interact with these devices and control their functionality are becoming increasingly constrained.

SUMMARY

Certain aspects of the present disclosure may enhance the usability and interaction of various mobile, computing, and consumer electronic devices by embedding sensors and wireless connectivity into "wearable" objects (e.g., rings, pendants, bracelets, and watches) and providing simple gesture mechanisms that translate the response of these sensors into simple control commands.

According to an aspect of the disclosure, a method for controlling a device is disclosed. The method includes dynamically selecting a set of mappings defining how a gesture made by a movement of at least one wearable item will be interpreted as one or more commands; determining whether the gesture has a mapping in the set of mappings; and translating the gesture into a command for the device based on the determination.

According to another aspect of the disclosure, an apparatus for controlling a device is disclosed. The apparatus includes a processing system configured to dynamically select a set of mappings defining how a gesture made by a movement of at least one wearable item will be interpreted as one or more commands; determine whether the gesture has a mapping in the set of mappings; and translate the gesture into a command for the device based on the determination.

According to another aspect of the disclosure, an apparatus for controlling a device is disclosed. The apparatus includes means for dynamically selecting a set of mappings defining how a gesture made by a movement of at least one wearable item will be interpreted as one or more commands; means for determining whether the gesture has a mapping in the set of mappings; and means for translating the gesture into a command for the device based on the determination.

According to another aspect of the disclosure, a watch for controlling a device is disclosed. The watch includes a receiver configured to receive signals for a gesture made by a movement of at least one wearable item. The watch also includes a processing system configured to dynamically select a set of mappings defining how the gesture will be interpreted as one or more commands; determine whether the gesture has a mapping in the set of mappings; and translate the gesture into a command for the device based on the determination.

According to another aspect of the disclosure, a computer-program product for controlling a device is disclosed. The computer-program product including a computer-readable medium having instructions executable to dynamically select a set of mappings defining how a gesture made by a movement of at least one wearable item will be interpreted as one or more commands; determine whether the gesture has a mapping in the set of mappings; and translate the gesture into a command for the device based on the determination.

According to another aspect of the disclosure, a method for interpreting movements of a wearable item as gestures associated with a command to control a controlled device is disclosed. The method includes sensing a movement of the wearable item; determining a first context in which the movement is sensed; and interpreting the movement as being indicative of a gesture relating to the command based on the first context.

According to another aspect of the disclosure, an apparatus for interpreting movements of a wearable item as gestures associated with a command to control a controlled device is disclosed. The apparatus includes a sensor configured to sense a movement of the wearable item. The apparatus includes a processing system coupled to the sensor and configured to determine a first context in which the movement is sensed; and interpret the movement as being indicative of a gesture relating to the command based on the first context.

According to another aspect of the disclosure, an apparatus for interpreting movements of a wearable item as gestures associated with a command to control a controlled device is disclosed. The apparatus includes means for sensing a movement of the wearable item; means for determining a first context in which the movement is sensed; and means for interpreting the movement as being indicative of a gesture relating to the command based on the first context.

According to another aspect of the disclosure, a watch is disclosed. The watch includes a sensor configured to sense a movement of the watch. The watch includes a processing system coupled to the sensor and configured to determine a first context in which the movement is sensed; and interpret the movement as being indicative of a gesture relating to a command to control a controlled device based on the first context. The watch also includes a transmitter coupled to the processing system and configured to transmit the command.

According to another aspect of the disclosure, a computer-program product for interpreting movements of a wearable item as gestures associated with a command is disclosed. The computer-readable medium includes instructions executable to sense a movement of the wearable item; determine a first context in which the movement is sensed; and interpret the movement as being indicative of a gesture relating to a command to control a controlled device based on the first context.

According to another aspect of the disclosure, a method for communicating control information by a wearable device is disclosed. The method includes determining an agreed upon set of control gestures between first and second devices, wherein the control gestures are performable using the first device and are supportable by the second device; and participating in a control sequence to control the second device via a wireless transmission corresponding to at least one of the control gestures to be performed by the first device.

According to another aspect of the disclosure, an apparatus for communicating control information by a wearable device is disclosed. The apparatus includes means for determining an agreed upon set of control gestures between first and second devices, wherein the control gestures are performable using the first device and are supportable by the second device; and means for participating in a control sequence to control the second device via a wireless transmission corresponding to at least one of the control gestures to be performed by the first device.

According to another aspect of the disclosure, an apparatus for communicating control information by a wearable device is disclosed. The apparatus includes a processing system configured to determine an agreed upon set of control gestures between first and second devices, wherein the control gestures are performable using the first device and are supportable by the second device; and participate in a control sequence to control the second device via a wireless transmission corresponding to at least one of the control gestures to be performed by the first device.

According to another aspect of the disclosure, a wearable device is disclosed. The wearable device includes at least one antenna. The wearable device also includes a processing system configured to determine an agreed upon set of control gestures between first and second devices, wherein the control gestures are performable using the first device and are supportable by the second device; and participate in a control sequence to control the second device, via a wireless transmission using the at least one antenna, corresponding to at least one of the control gestures to be performed by the first device.

According to another aspect of the disclosure, a computer-program product for communicating control information by a wearable device is disclosed. The computer-readable medium includes instructions executable to determine an agreed upon set of control gestures between first and second devices, wherein the control gestures are performable using the first device and are supportable by the second device; and participate in a control sequence to control the second device via a wireless transmission corresponding to at least one of the control gestures to be performed by the first device.

Although particular aspects are described herein, many variations and permutations of these aspects fall within the scope of the disclosure. Whereas some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following Detailed Description. The detailed description and drawings are merely illustrative of the disclosure rather than limiting, the scope of the disclosure being defined by the appended claims and equivalents thereof.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
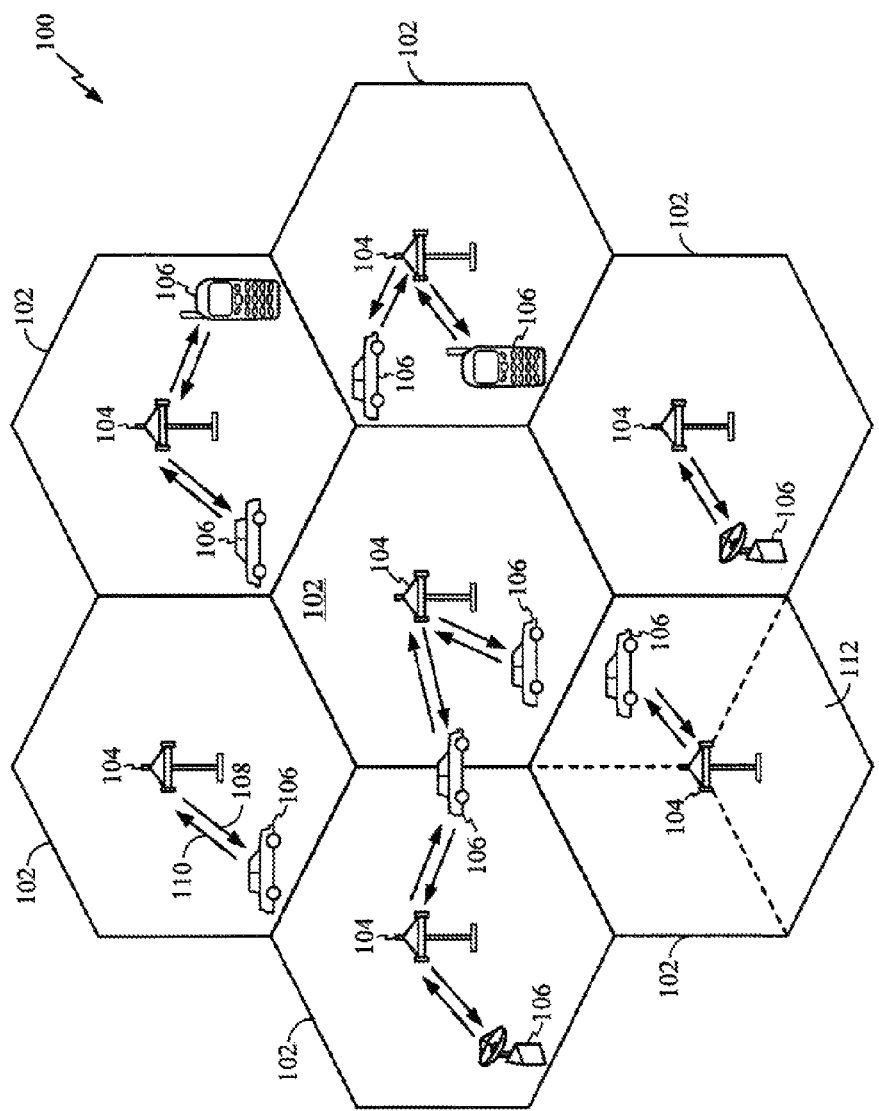
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme and a single carrier transmission. Examples of such communication systems include Orthogonal Frequency Division Multiple Access (OFDMA) systems, Single-Carrier Frequency Division Multiple Access (SC-FDMA) systems, Code Division Multiple Access (CDMA), and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A CDMA system may utilize spread-spectrum technology and a coding scheme where each transmitter (i.e., user) is assigned a code in order to allow multiple users to be multiplexed over the same physical channel.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. IEEE 802.16x approved "IEEE P802.16d/D5-2004" in May 2004 for fixed BWA systems and published "IEEE P802.16e/D12 October 2005" in October 2005 for mobile BWA systems. The latest revision of the IEEE 802.16, "IEEE P802.16Rev2/D8 December 2008", a draft standard, now consolidates materials from IEEE 802.16e and corrigendum. The standards define four different physical layers (PHYs) and one medium access control (MAC) layer. The OFDM and OFDMA physical layer of the four physical layers are the most popular in the fixed and mobile BWA areas respectively.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system. Alternatively, signals may be sent and received between the base stations 104 and the user terminals 106 in accordance with CDMA technique. If this is the case, the wireless communication system 100 may be referred to as a CDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
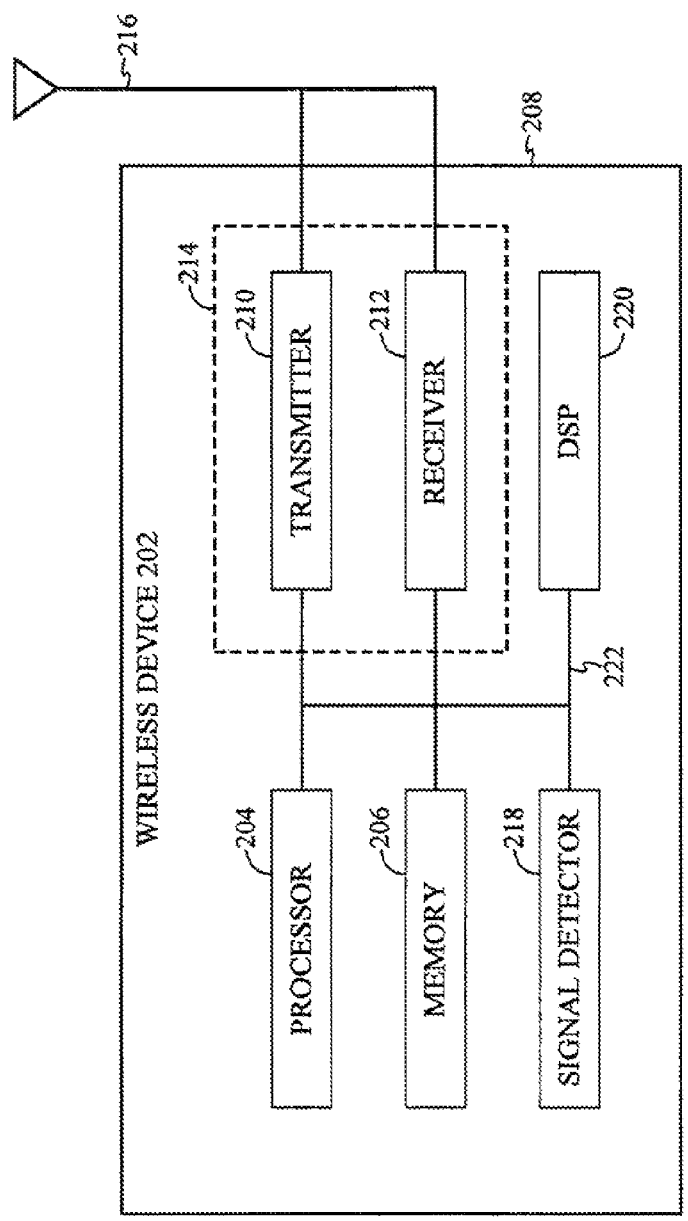
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
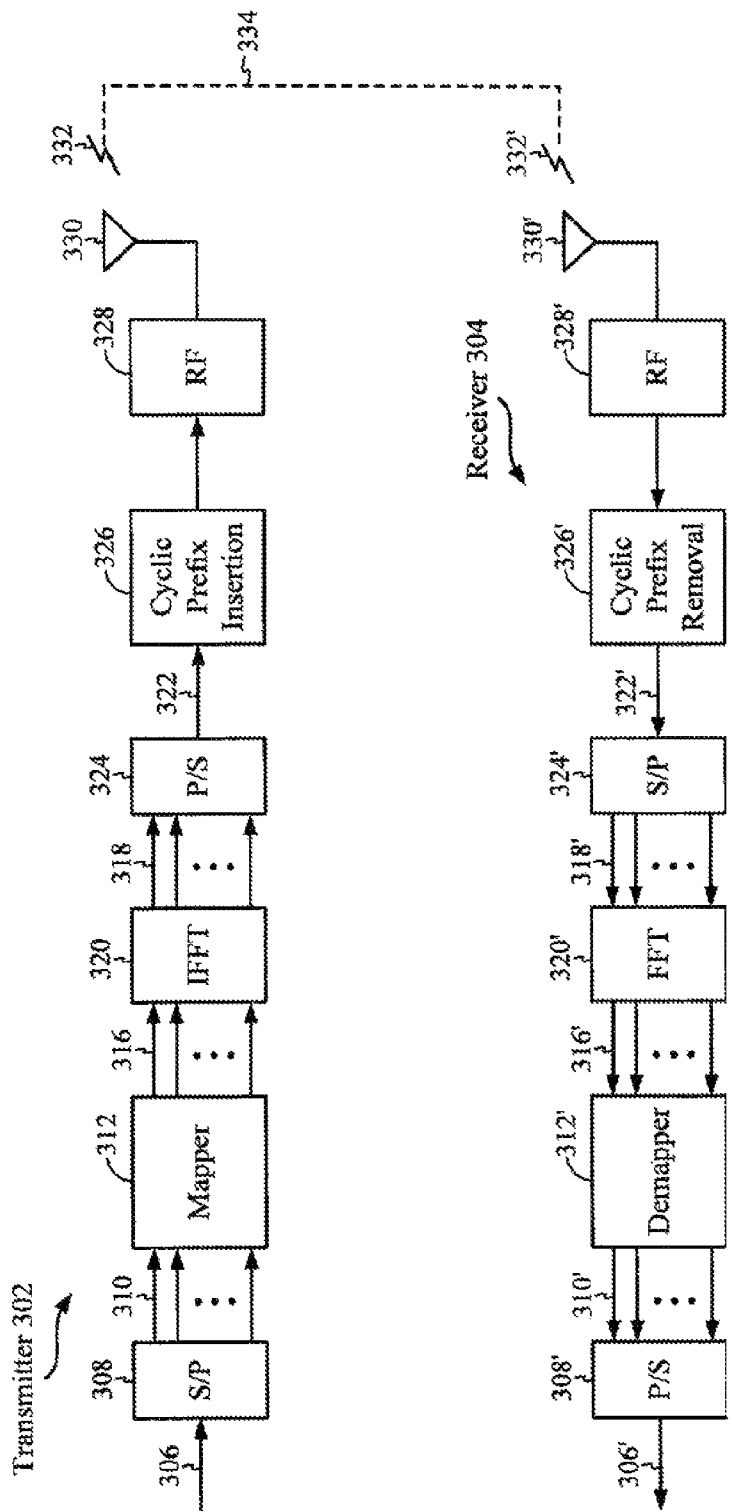
FIG. 3 illustrates an example transmitter and an example receiver that may be used within a wireless communication system in accordance with certain aspects of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_S$, is equal to $N_{CP}$ (the number of cyclic prefix (CP) samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A cyclic prefix insertion component 326 may insert a CP between successive OFDM/OFDMA symbols in the OFDM/OFDMA symbol stream 322. The output of the CP insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A CP removal component 326' may then remove the CP that was inserted between OFDM/OFDMA symbols by the CP insertion component 326.

The output of the CP removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Figure 4:
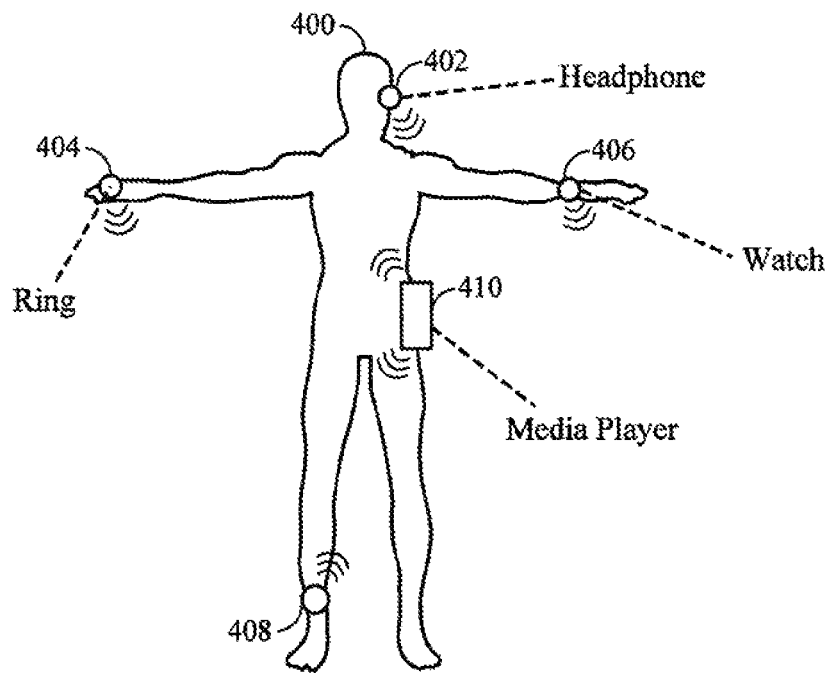
FIG. 4 illustrates an example of a body area network (BAN) in accordance with certain aspects of the present disclosure.

FIG. 4 illustrates an example of a body area network (BAN) 400 that may correspond to the wireless system 100 illustrated in FIG. 1. BANs represent a promising concept for consumer applications. Certain aspects of the present disclosure will describe how a BAN may provide a platform for controlling various devices via a distributed user interface formed by one or more wearable devices.

The BAN may consist of various devices worn (or wearable) on a body 400. For example, the BAN may include a ring 404 and watch 406 which may communicate wirelessly to form a distributed user interface (UI) to control a device 410, such as a mobile, computing, or consumer electronics (CE) device (e.g., a media player).

As will be described in greater detail below, certain gestures made with the ring 404 (such as rotating, sliding, or tilting) may be translated as commands to control the device 410. As a simple example, rotation of the ring 404 may be used to control a volume of an audio signal (e.g., for a song or voice call) output from the device 410 to a headset 402 or speakers (not shown).

In some cases, feedback acknowledging commands effected with gestures made with the ring 404 may be provided. For example, tactile or audible feedback may be provided as vibration (or mild electric stimulus) via the ring 404, watch 406, or headset 402. Other wearable (or otherwise portable) devices that may operate to control a device include necklaces, pendants, cufflinks, buttons, bracelets, and the like.

Such devices may also be added to purpose built UI devices, such as an "active surface area" (ASA) that is sensitive and responds to touch or gestures. Note that an ASA may be integrated as part of a display (e.g., as a touch screen on a watch, mobile phone, or PDA). These objects can be manipulated in a number of different ways that result in different types of outputs for each action. Examples of such actions are provided in the following table:

| Action/Input | Feedback |
| --- | --- |
| Turning | User feedback with auxiliary device (display/audio) |
| Tapping | Vibration or static pulse |
| Gestures on an ASA | Display (co-located and separate) |
| Tilting | User feedback with auxiliary device (display/audio) |
| Shifting | User feedback with auxiliary device (display/audio) |

By linking and coupling one or more of the objects described above with a mobile, computing or CE device, these actions and corresponding outputs can be translated (or mapped) into sets of control commands that manage the interaction of the user with these devices and the functionality and applications they provide.

Figure 5:
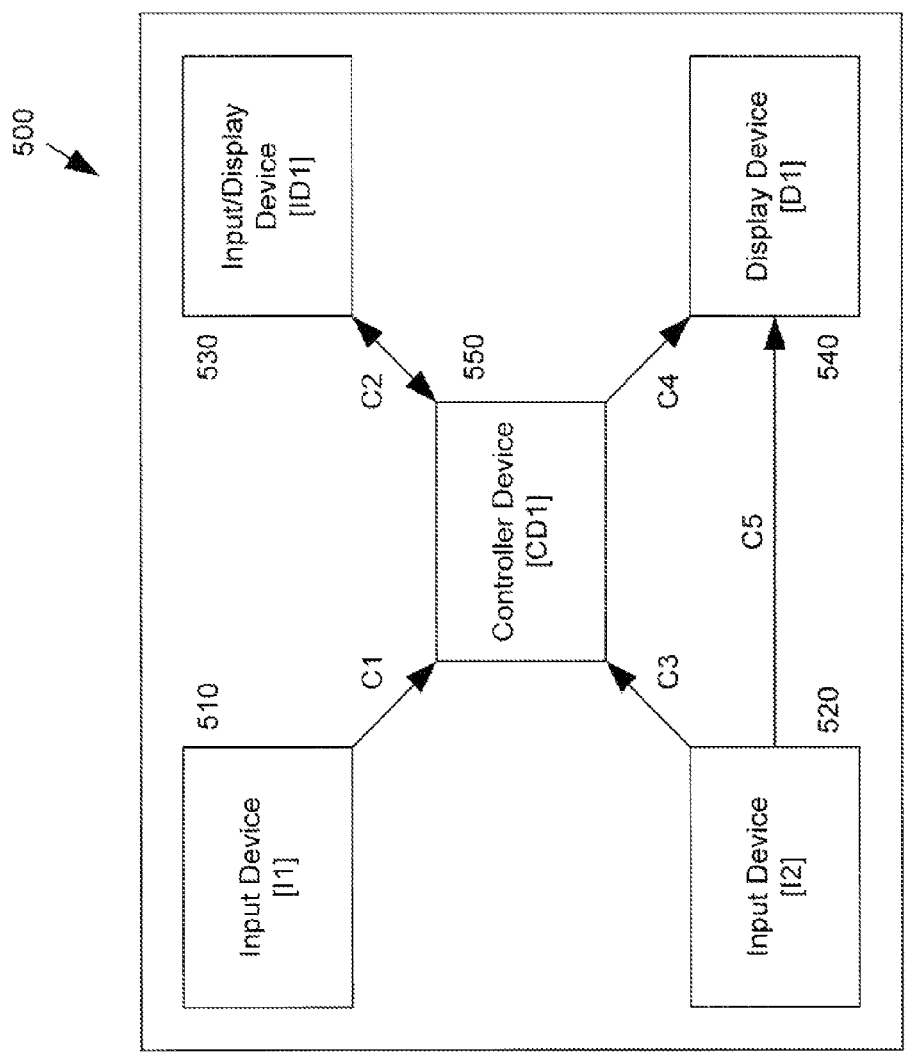
FIG. 5 illustrates an example block diagram of a BAN in accordance with certain aspects of the present disclosure.

FIG. 5 illustrates an example block diagram of a system in which a device may be controlled for a certain set of functionality by gestures (e.g., spatial and gestural motions) of one or move distributed UI devices in accordance with certain aspects of the present disclosure.

Input (only) devices I1 510 and I2 520 may be distinguished between input devices capable of providing information as well, such as ID1 530. Finally the system may also include a pure informational display device D1 540 and the actual controller/controlled device CD1 550. As used herein, the terms "controller" and "controlled device" may be used interchangeably. Of course, various embodiments may have any combination of such devices and their subsets employed.

In the particular example illustrated, I1 510 may be capable of translating user gestures into interpretable input to the controller CD1 550 (via a wireless connection C1). I2 520 may be capable of such translation as well, however, I2 520 may be capable of providing such input to the controller CD1 550 (via a wireless connection C3), as well as to display device D1 540 directly (via a wireless connection C5).

While CD1 550 may use such input as control over its behavior, D1 540 may just provide more detailed feedback to a user's actions (e.g., based on input from CD1 550 via wireless connection C4). An example may be scrolling through a list (displayed on D1 540) via a repetitive gesture with I2 520 (e.g., tapping or rotating). A further example of an input device is in form of a combined input/display device ID1 530, which may also provide the option of direct user feedback (both via a bi-directional wireless connection C2).

Thus, the techniques presented herein may involve operations performed by various elements working together. Such operations may include a controlled device (e.g., a Mobile/Computing/CE Device) selection of functionality/application and appropriate control channels for one or move distributed UI devices to control the functionality/application, controlled device-based selection of power mode and sleep cycle management, definition of gesture and motion command set for a particular functionality or application, detection of motion and/or gestures corresponding to the command set, and providing tactile, audio or visual feedback to a user.

Figure 6:
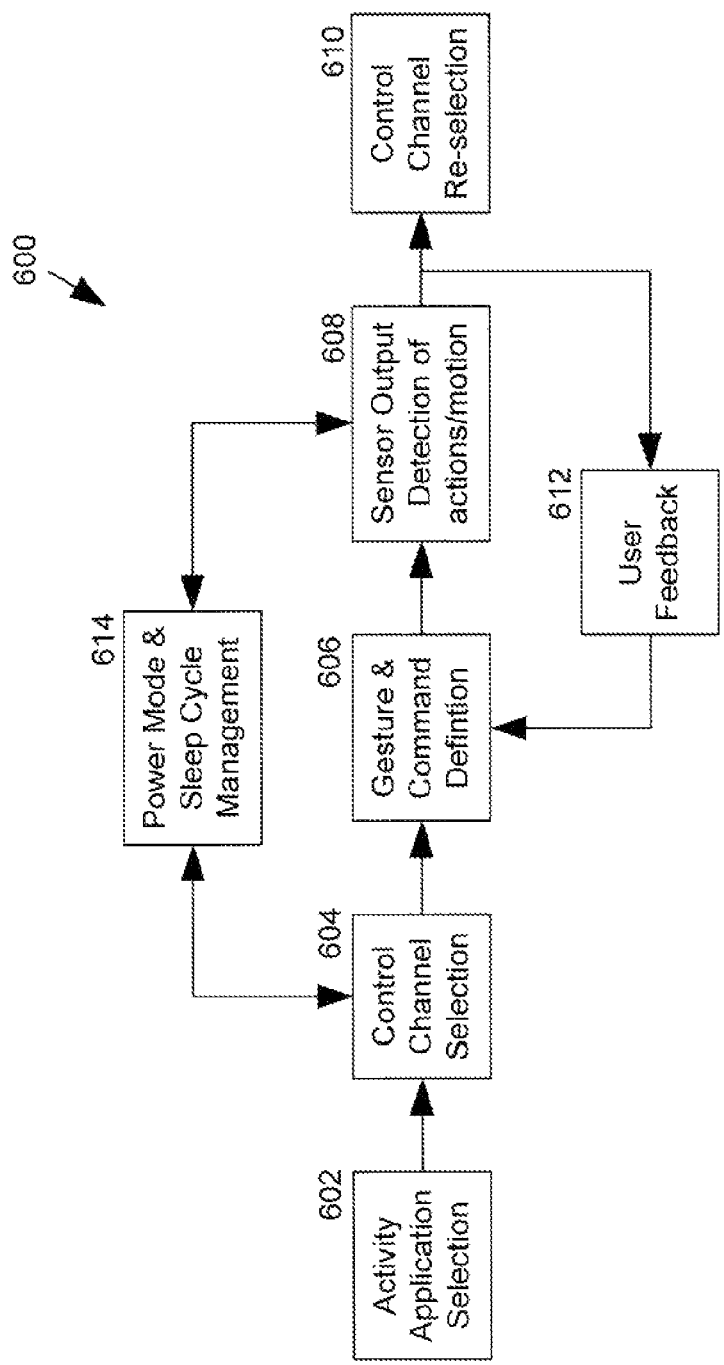
FIG. 6 illustrates an example distributed user interface (UI) control command flow diagram in accordance with certain aspects of the present disclosure.

FIG. 6 illustrates an example distributed user interface (UI) control command flow diagram in accordance with certain aspects of the present disclosure. In the example, an application identifies the specific input and output devices to be associated based on an activity in step 602. It should be noted that this step may be user initiated or based on other events initiated by events such as machine to machine communications, time events, and others. Given the control requirements of a specific activity, the applicable subset of available input and/or output devices may then be selected and the appropriate control channels are established in step 604. This operation may also include setup of any security related credentials for authentication and confidentiality of the control channels.

Following this, in step 606, available gesture translations and their meaning may be negotiated between input devices and the controller, and available output devices are configured for their corresponding roles. Furthermore, based on the activity requirements, parameters for the power modes and sleep cycles may be configured in step 614. After such configuration has taken place, input devices may be able to translate a user's gestures into actual control commands to manage the behavior of the controller in step 608 and optionally trigger user feedback on display or other feedback devices in step 612. Finally, a control channel set may be re-configured or deactivated based on direct user gestures or other high-level application controls in step 610.

It should be noted that gesture detection, translation, and interpretation may be distributed between the input device and the controller in different ways based on each device's capabilities and timing requirements. In other words, rather than actually perform translation and/or interpretation at an input device, raw sensor data may be transmitted to another device (and/or the controller) for translation and/or interpretation.

Various gestures can be used as human triggers that correspond to various commands. A near unlimited range of possible gestures might be used to trigger commands. However, given the form factor of common accessories, three main movements may be leveraged: rotation, tilting, and longitudinal shifting. Rotation is a very intuitive motion and can be applied to many items with some circular symmetry aspects, e.g. a ring turned around the finger, an earring being twisted, or a watch bezel being turned. Tilting also applies to a number of items, such as a ring being tilted against the finger, or a bracelet tilted against the arm. Finally longitudinal shifting can be e.g. applied by moving a ring along a finger, moving an earring up and down, or shifting a watch along the arm. While the rotational gestures lend themselves well for selective input (e.g. scrolling through a list of items or adjusting the volume of music playback), tilting and shifting are more suitable for acknowledging input such as selection of a specific item or skipping to the next music track.

As will be described in greater detail below, in some cases, input from multiple devices (or the context in which in put is received) may be considered before a gesture is considered as being detected. For example, a user rotating their wrist may result in the raw sensor data from a ring indicating rotation, as if the ring itself were rotated on a finger. Therefore, sensor data from a watch may be considered and the ring rotation may not be interpreted as corresponding to a command if the watch is being rotated to. As an alternative, sensor data indicating relative movement to the body may also be considered and, absent relative movement between the ring and body, the rotation may not be interpreted as corresponding to a command.

Similarly, various context information may also be used. If a device is not powered up or playing, various gestures may simply be ignored rather than interpreted as commands.

Example user feedback mechanisms that may be used in accordance with various aspects of the disclosure will now be described. User feedback of an action may be implicit or explicit. An implicit example might be an auxiliary display showing a list that is being scrolled through. The change of the highlighted item might then implicitly indicate the user action. An explicit example might be any input use case where the result of the action is not immediately apparent. As an example, if an input device is used to acknowledge dialing a phone number, the feedback of a subsequent ringtone is not sufficient for a good user experience (since there may be significant delay before the ring tone). Immediate feedback examples are a display change, or feedback by the input device itself.

For display-capable input devices, user feedback may be relatively easy to accomplish. However, for non-display devices various methods may also identified. For example, a device may employ a mild electric stimulus (e.g., a surface charge just above common human perception levels) to provide tactile feedback, or it may employ direct motion feedback such as vibration. Note that for power savings reasons the feedback may only consist of a single actuation.

Figure 7:
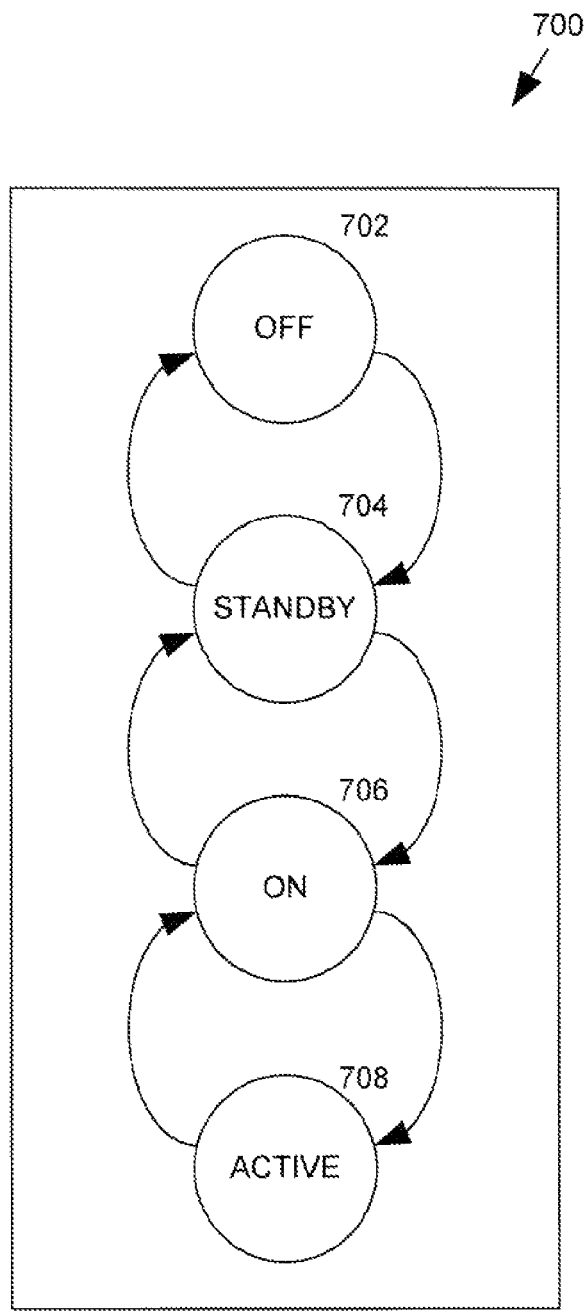
FIG. 7 illustrates an example state diagram of a distributed UI device in accordance with certain aspects of the present disclosure.

Given the size constraint of many of the applicable form factors (e.g., providing limited space for a battery), power efficiency of the devices may be an important consideration. FIG. 7 illustrates an example state machine of a power management function 700.

To conserve power, a device may typically be maintained in an OFF state 702 when not in use. Upon configuration as part of one or more control channels, the device then enters a STANDBY state 704. In this state, the device may have the following mechanisms configured: gesture detection and interpretation, wake-up and sleep triggers, and connectivity to other devices. Based on the wake-up triggers, the device may enter an ON state 706, in which it actively tries to detect gestures.

When a gesture is detected, the device may enter an ACTIVE state 708, in which any interpretation algorithm may be applied. In case of successful interpretation, corresponding information is transmitted. The transition back to the ON state 706 may be dependent on the gesture. In case of a continuous selective gesture, such as rotation, the transition may be based on a minimum time without any movements. In case of a selective gesture, this transition may be applied immediately following the user action.

The transition from the ON state 706 to the STANDBY state 704 may be based on a number of configured parameters such as inactivity timers or dedicated user actions. The transition to the OFF state 702 is based on de-selection of the device from the current control channel set. This may be based on a higher-level application action or an immediate gesture to turn the device off.

As described above, one example embodiment of a distributed UI involves a ring for user input and a watch display utilized as a remote UI for a cellular telephone or other device. The following tables details various possible roles of the individual components in such an embodiment:

| EVENT | INPUT (RING) | DISPLAY (WATCH) |
| --- | --- | --- |
| Incoming call | Single-tap to answer, rotate to send to VM | Caller ID |
| Volume control during call | Rotate | None |
| Audio source selection | Tilt | Show current audio source (e.g. phone, headset, car system) |
| End call | Double-tap | Call time |
| Recall recent calls | Double-tap to open recent calls | Display time-ordered list of calls |
| Select call from recent call list | Rotate | Change highlighted entry according to rotational direction |
| Initiate call to recent-list entry | Single-tap | Display call status |

In another example embodiment a ring and watch display are employed as a remote UI for a mobile music player. The following table details possible roles of individual components in such an embodiment:

| EVENT | INPUT (RING) | DISPLAY (WATCH) |
| --- | --- | --- |
| Pause/Play | Single-tap | Song information, pause/play status |
| Volume control during playback | Rotate | None |
| Track skipping | Tilt (up for fwd, down for prev) | Song information |
| Stop player | Double-tap | Idle screen |

Figure 8:
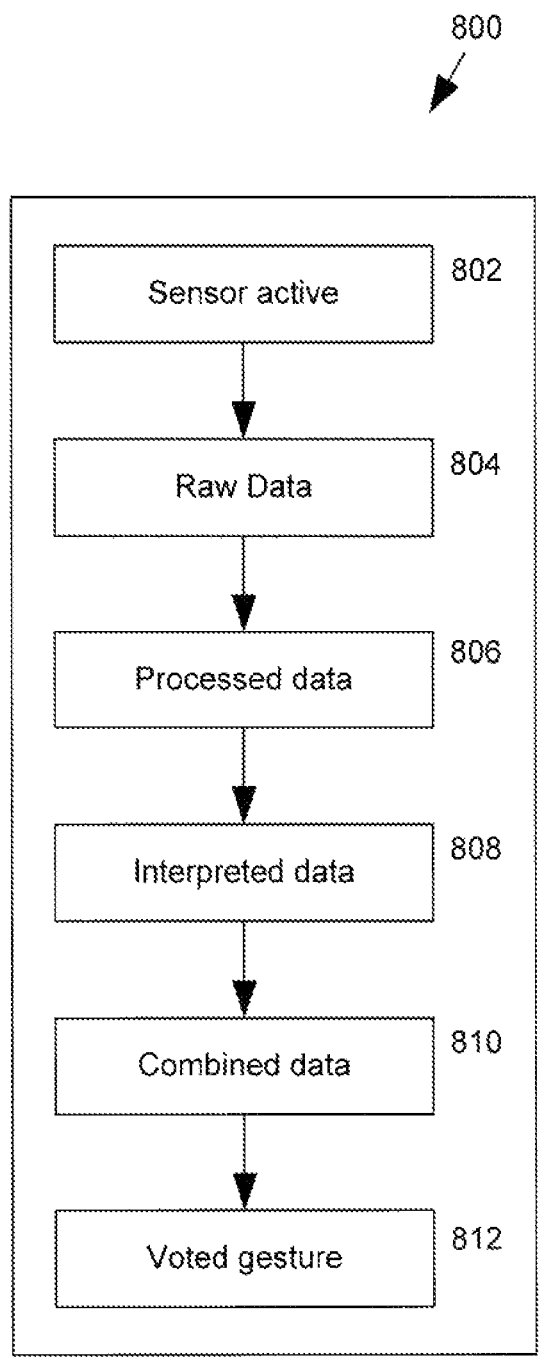
FIG. 8 illustrates an example control processing flow of a distributed UI device in accordance with certain aspects of the present disclosure.

FIG. 8 illustrates an example processing flow 800 of detecting and interpreting a gesture based on sensor data from a device. As noted above, various operations may be distributed between different devices. The sensor is activated in step 802 and raw sensor data is obtained in step 804. The sensor data is processed in step 806 and interpreted in step 808. The interpreted data may be combined in step 810, for example, with other sensor data (e.g., to distinguish between wrist rotation and actual ring rotation on a finger). Finally, based on the combined data a determination may be made in step 812 as to whether a gesture corresponds to a control command.

Figure 9:
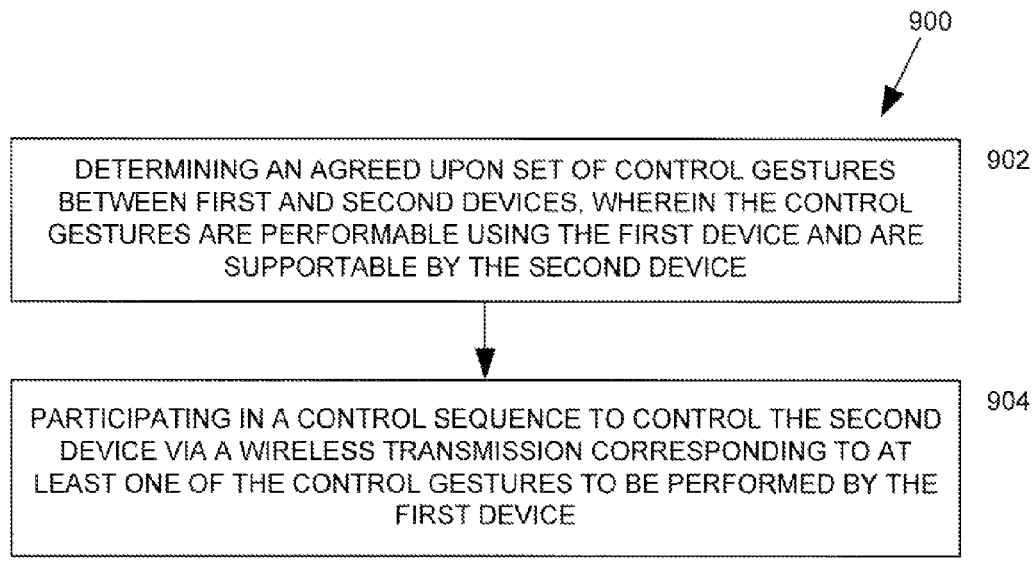
FIG. 9 illustrates example operations that may be performed by a wearable device in accordance with certain aspects of the present disclosure.
Figure 9A:
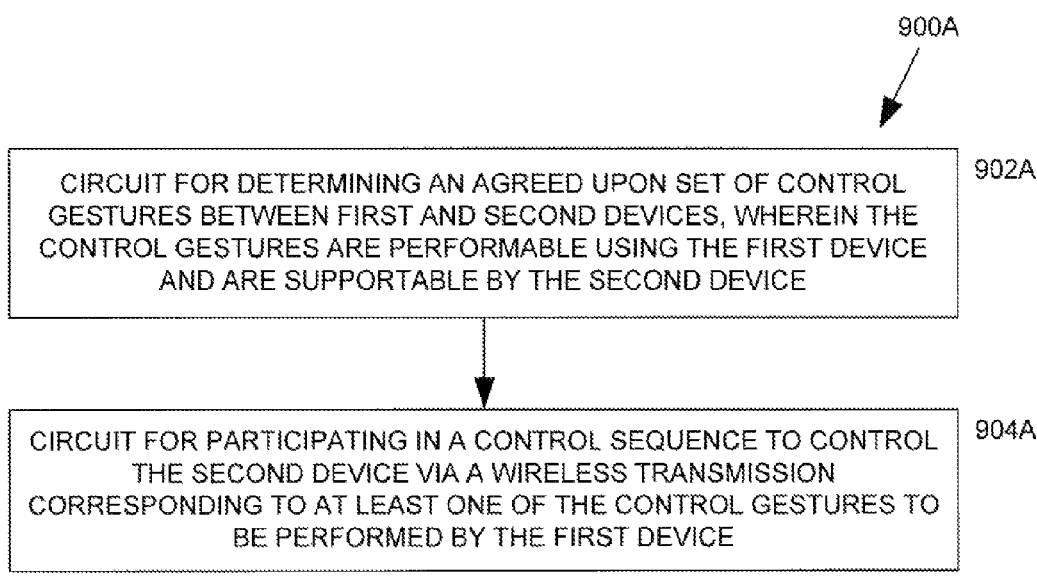
FIG. 9A illustrates example components capable of performing the operations shown in FIG. 9.

FIG. 9 illustrates example operations 900 that may be performed by a wearable device in accordance with certain aspects of the present disclosure. As illustrated, the operations may include determining an agreed upon set of control gestures between first and second devices, wherein the control gestures are performable using the first device and are supportable by the second device in step 902. For example, an audio player, the second device, may advertise that it supports volume control by rotation, song selection by tilting or tapping, and the like, of the wearable device, the first device. In response, an indication of one or more control gestures that may be performed utilizing the first device may be transmitted. The first device may then participating in a control sequence to control the second device via a wireless transmission corresponding to at least one of the control gestures to be performed using the first device in step 904.

According to certain aspects, the wearable device may provide user feedback upon detection of a gesture via one or more of the following mechanisms: tactile feedback, actuation or vibration, visual, or audible feedback. According to various aspects, the wearable device may transmit raw sensor data to the controlled device, which may perform the data processing required to perform gesture detection. Upon successful detection the controlled device may send an acknowledgement to the wearable device enabling a feedback mechanism.

According to certain aspects, the wearable device may process the raw sensor data into an intermediate format to be transmitted to the controlled device, and wherein the controlled device performs the gesture detection processing. Upon successful detection the controlled device may send an acknowledgement to the wearable device enabling a feedback mechanism.

According to certain aspects, the wearable device may process the sensor data and performs gesture detection. The wearable device may notify the controlled device of the gesture detected and may provide user feedback.

Figure 10:
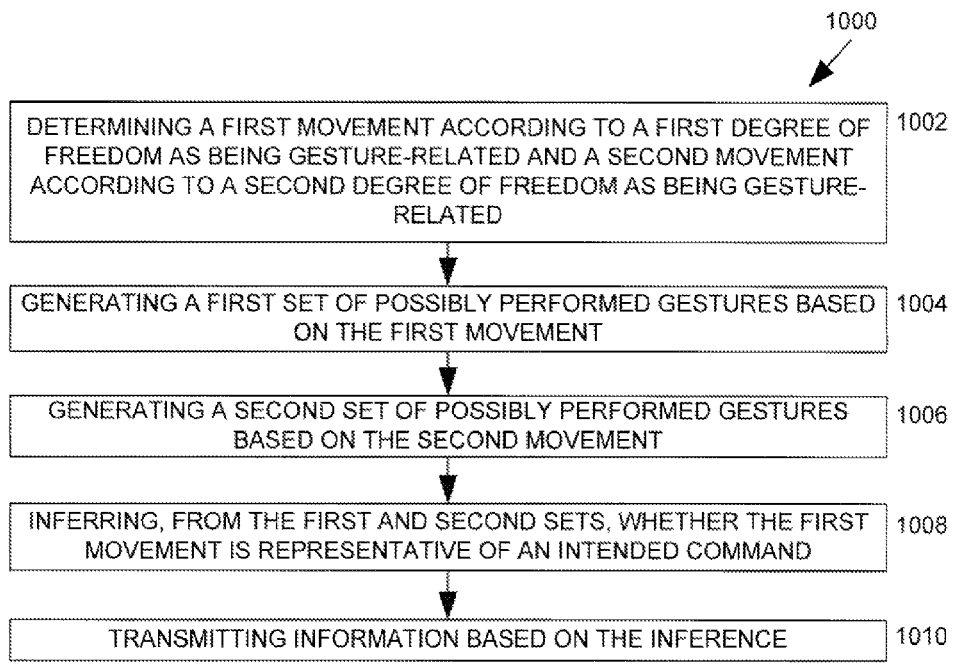
FIG. 10 illustrates example operations that may be performed by a controlled device in accordance with certain aspects of the present disclosure.
Figure 10A:
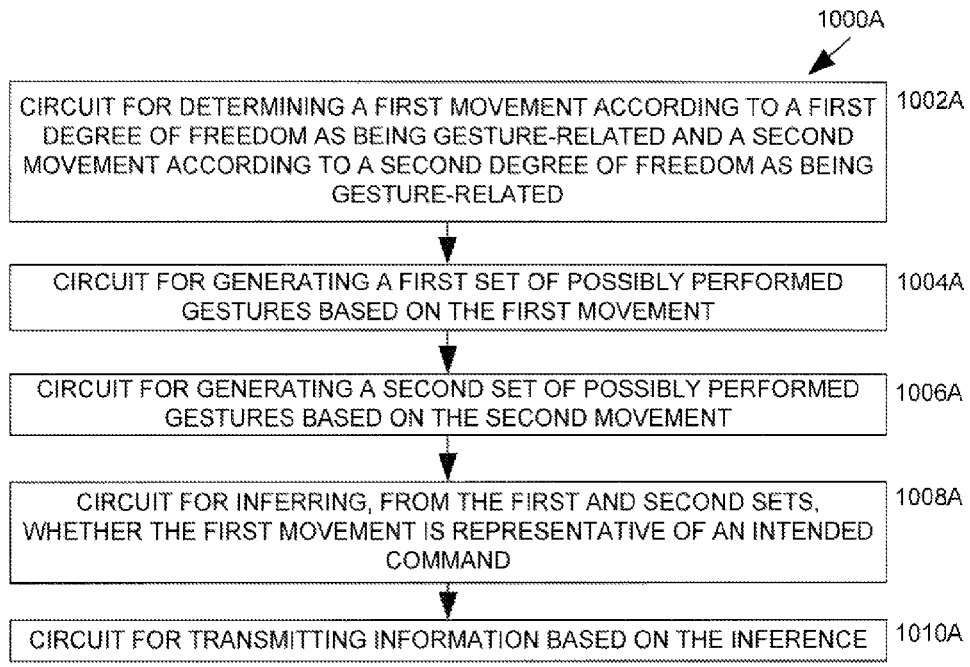
FIG. 10A illustrates example components capable of performing the operations shown in FIG. 10.

FIG. 10 illustrates communicating control information by a wearable device in accordance with certain aspects of the present disclosure. As illustrated, the operations may include determining a first movement according to a first degree of freedom as being gesture-related and a second movement according to a second degree of freedom as being gesture-related in step 1002, generating a first set of possibly performed gestures based on the first movement in step 1004; generating a second set of possibly performed gestures based on the second movement in step 1006; inferring, from the first and second sets, whether the first movement is representative of an intended command in step 1008; and transmitting information based on the inference in step 1010. As noted above, various forms of feedback may be provided by the controlled device.

Figure 11:
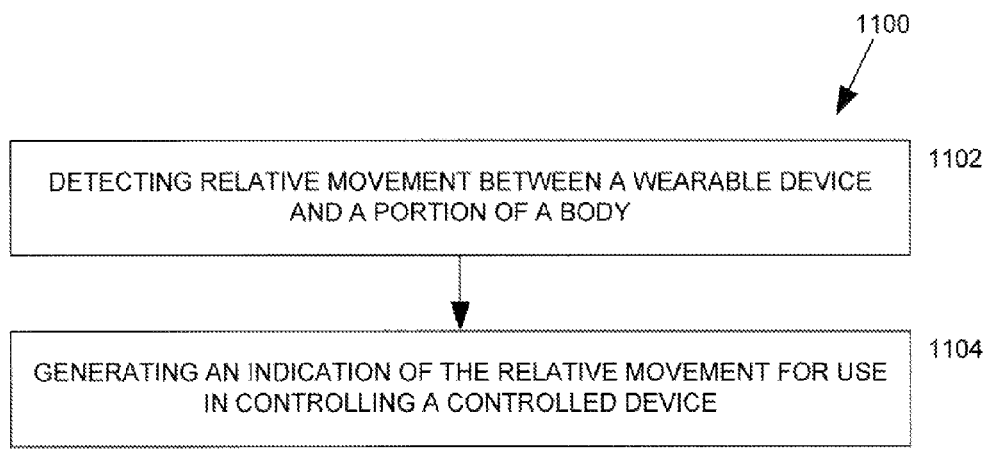
FIG. 11 illustrates example operations for a distributed user interface in accordance with certain aspects of the present disclosure.
Figure 11A:
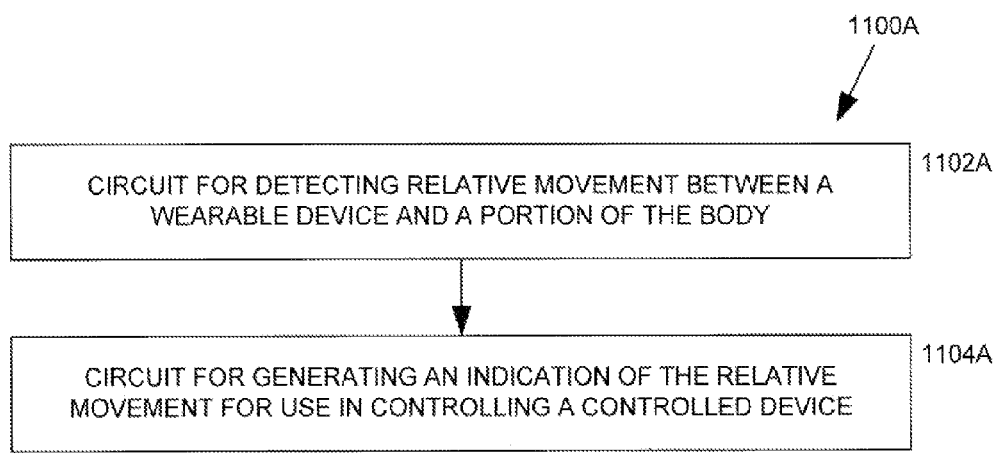
FIG. 11A illustrates example components capable of performing the operations shown in FIG. 11.

FIG. 11 illustrates example operations for a distributed user interface for controlling a controlled device with a device wearable on a portion of a body in accordance with certain aspects of the present disclosure. As illustrated, the operations may include detecting relative movement between the wearable device and the portion of the body in step 1102 and generating an indication of the relative movement for use in controlling the controlled device in step 1104. As noted above, the wearable device may transmit raw data indicative of the relative movement or transmit another indication of the movement.

According to certain aspects, the wearable device may contain one or more or any combination of the following: sensors capable of detecting contact, sensors capable of detecting lateral movements of two surfaces against each other, sensors capable of detecting directional or rotational spatial motion (accelerometer), sensors capable of detecting tilting spatial motion, sensors capable of detecting lateral or longitudinal structural forces (flexing).

According to certain aspects, the wearable device may combine sensor data of any of its sensors to perform the process of gesture detection.

According to certain aspects, the controlled device may combine sensor data it received from multiple sensors within first wearable device or data it received from sensors embedded in multiple wearable devices to perform the process of gesture detection.

According to certain aspects, first and second wearable devices may communicate directly to exchange data from multiple sensors embedded in multiple wearable devices to perform the process of gesture detection.

Figure 12:
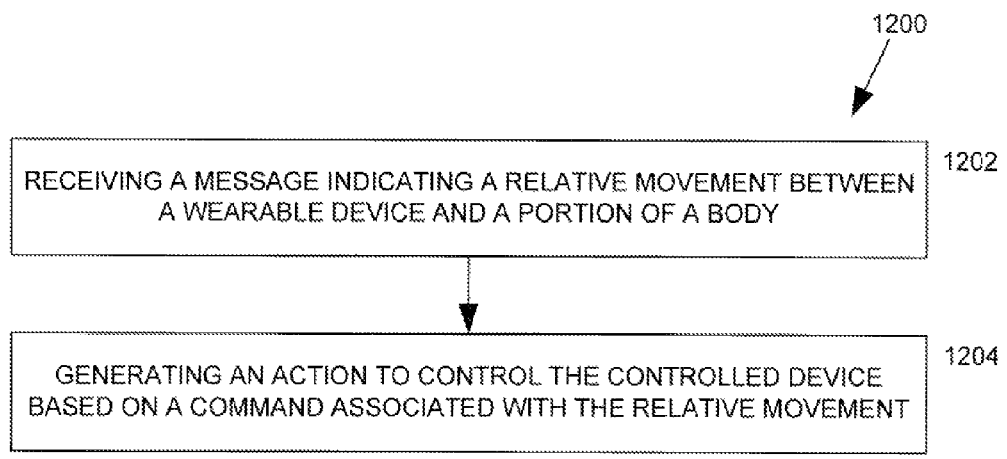
FIG. 12 illustrates example operations that may be performed by a controlled device in accordance with certain aspects of the present disclosure.
Figure 12A:
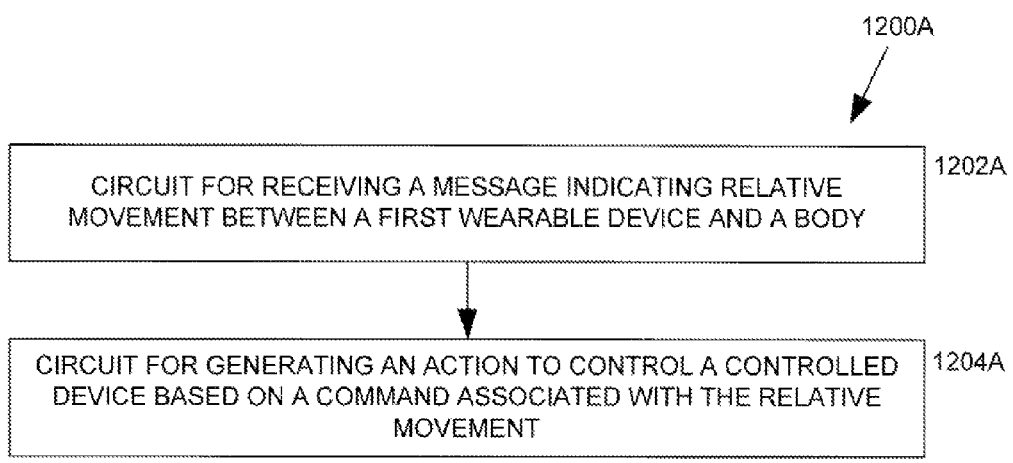
FIG. 12A illustrates example components capable of performing the operations shown in FIG. 12.

FIG. 12 illustrates example operations that may be performed for controlling a controlled device with a device wearable on a portion of a body in accordance with certain aspects of the present disclosure. As illustrated, the operations may include receiving a message indicating a relative movement between the wearable device and the portion of the body in step 1202; and generating an action to control the controlled device based on a command associated with the relative movement in step 1204.

As noted above, the wearable device may interpret the raw data as a gesture, interpret the gesture as a command (based on translations), and/or send only raw data. In addition, as also noted above, gestures may be interpreted based on other sensor data or context.

Figure 13:
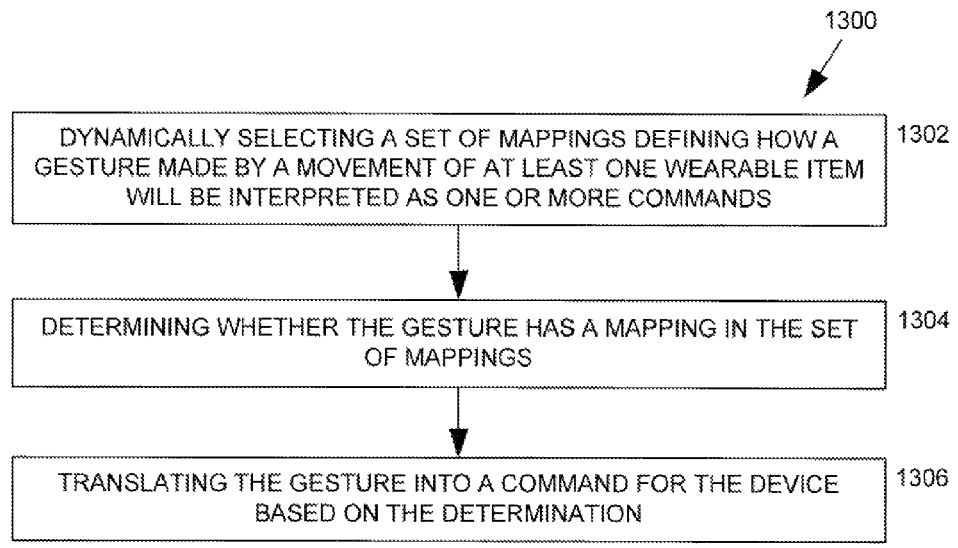
FIG. 13 illustrates example operations for controlling a device in accordance with certain aspects of the present disclosure.
Figure 13A:
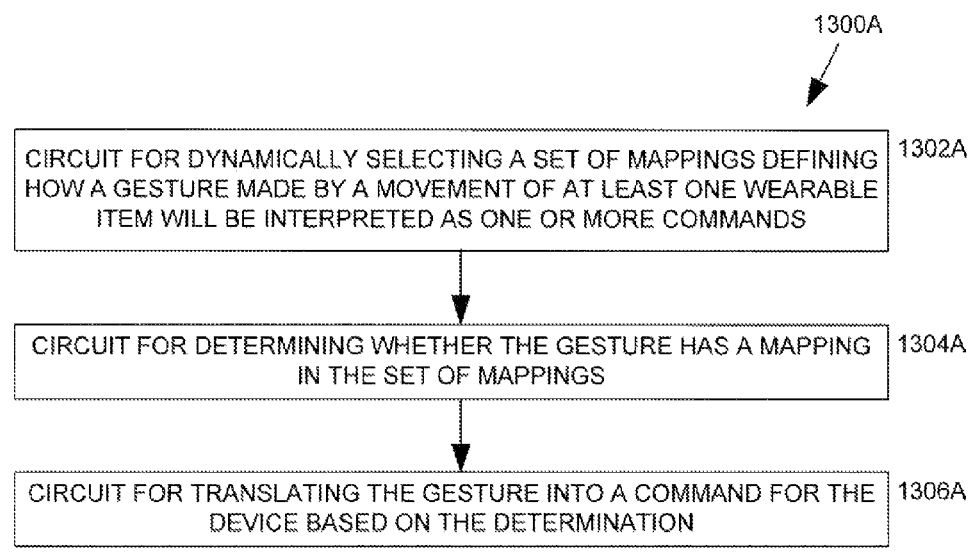
FIG. 13A illustrates example components capable of performing the operations shown in FIG. 13.

FIG. 13 illustrates example operations 1300 for controlling a device in accordance with certain aspects of the present disclosure. As illustrated, the operations may include dynamically selecting a set of mappings defining how a gesture made by a movement of at least one wearable item will be interpreted as one or more commands in step 1302; determining whether the gesture has a mapping in the set of mappings in step 1304; and translating the gesture into a command for the device based on the determination in step 1306. As noted above, various operations may be distributed between multiple devices.

Figure 14:
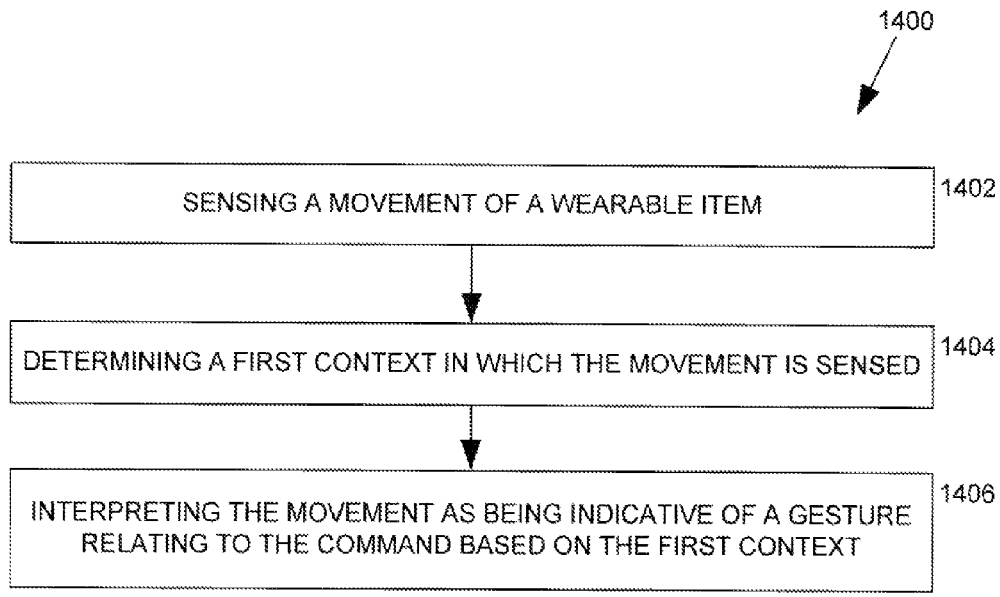
FIG. 14 illustrates example operations for interpreting a gesture as a command in accordance with certain aspects of the present disclosure.
Figure 14A:
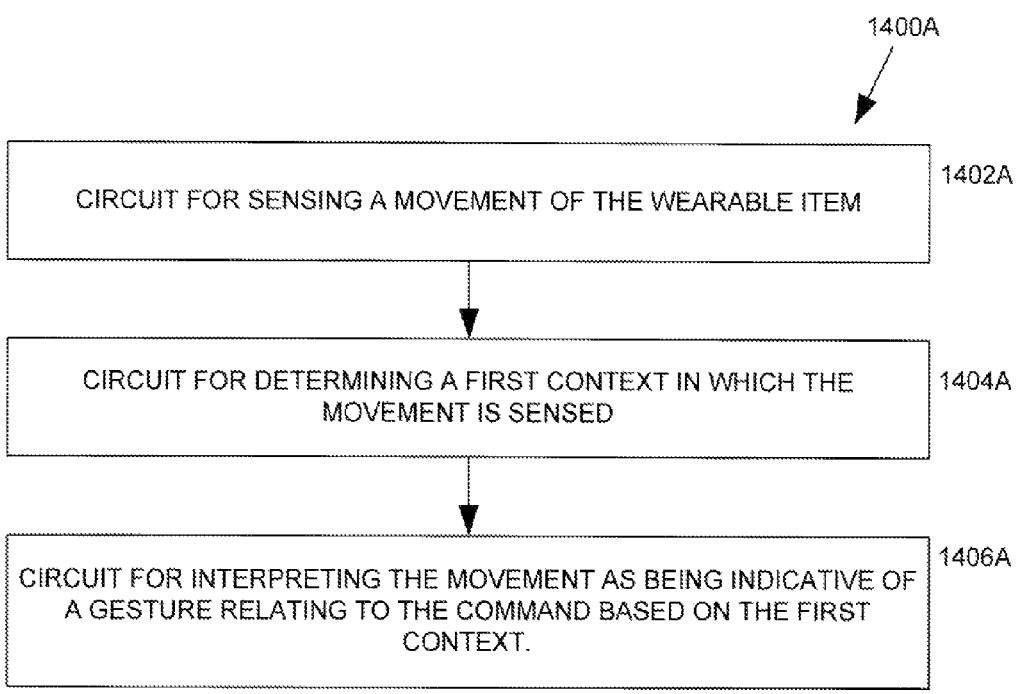
FIG. 14A illustrates example components capable of performing the operations shown in FIG. 14.

FIG. 14 illustrates example operations 1400 for interpreting movements of a wearable item as gestures associated with a command to control a controlled device in accordance with certain aspects of the present disclosure. As illustrated, the operations may include sensing a movement of the wearable item, the movement comprising at least one of sliding, rotating, tilting, flexing, and tapping in step 1402; determining a first context in which the movement is sensed in step 1404; and interpreting the movement as being indicative of a gesture relating to the command based on the first context in step 1406. As noted above, various operations may be distributed between multiple devices. The context may correspond to different states and/or sensor data.

According to certain aspects, a first context the movement is sensed in is defined by the operational state the wearable device is in (e.g., ON/OFF). According to certain aspects, a first context the movement is sensed in is defined by the application context of the wearable device, and said application context may be selected by the wearable device or the controlled device based on direct user actions or implicit conditions. According to certain aspects, a first context the movement is sensed in is defined or selected from a set of previously configured applicable contexts by the movement of another wearable item. According to certain aspects, a first context the movement is sensed in is used to interpret the data sensed by multiple sensors within first wearable device or multiple sensors embedded in multiple wearable devices (e.g., to differentiate b/w rotating ring and rotating wrist). According to certain aspects, a first context the movement is sensed in is used by the controlled device to interpret the data received from multiple sensors embedded in one or more wearable devices. According to certain aspects, a first context the movement is sensed in is used by the wearable device to determine whether any step of the process to perform gesture detection needs to be initiated. According to certain aspects, a first context the movement is sensed in is used by the controlled device to determine whether any step of the process to perform gesture detection needs to be initiated.

According to certain aspects, the data received from multiple sensors may be prioritized based on first context the movement is sensed in to aid in the combining and interpretation of said data.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 900, 1000, 1100, 1200, 1300, and 1400 illustrated in FIGS. 9-14 may correspond to circuit blocks 900A, 1000A, 1100A, 1200A, 1300A, and 1400A illustrated in FIGS. 9A-14A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, a plurality of DSP cores, one or more microprocessors in conjunction with one or more DSP cores, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an access terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

A wireless device in the present disclosure may include various components that perform functions based on signals that are transmitted by or received at the wireless device. A wireless device may also refer to a wearable wireless device. In some aspects the wearable wireless device may comprise a wireless headset or a wireless watch. For example, a wireless headset may include a transducer adapted to provide audio output based on data received via a receiver. A wireless watch may include a user interface adapted to provide an indication based on data received via a receiver. A wireless sensing device may include a sensor adapted to provide data to be transmitted via a transmitter.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 210 or 302 and receiver 212 or 304) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA") or so-called smartphone, an entertainment device (e.g., a portable media device, including music and video players), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitoring device that may receive data from the medical or environment sensing device (e.g., a desktop, a mobile computer, etc.), a point-of-care device, a hearing aid, a set-top box, or any other suitable device. The monitoring device may also have access to data from different sensing devices via connection with a network.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for controlling a device, comprising:
   receiving first and second signals from first and second wearable items, wherein the first and second signals comprise information indicating movements of the first and second wearable items, respectively;
   determining that the movement of the first wearable item was intended for one or more commands and the movement of the second wearable item was not intended for any command based on the first and second signals indicating that the movements of the first and second wearable items occurred at the same time and in substantially the same direction;
   dynamically selecting a set of mappings defining how a gesture made by the movement of the first wearable item will be interpreted as the one or more commands;
   determining whether the gesture has a mapping in the set of mappings;
   translating the gesture into the one or more commands for the device based on the determination; and
   transmitting an acknowledgement to the first wearable item, wherein the acknowledgment indicates a successful detection of the gesture, and wherein the acknowledgement is configured to initiate a feedback response at the first wearable item.

2. The method of claim 1, wherein the dynamic selection of the set of mappings is based on an application context.

3. The method of claim 1, wherein the first signal comprises raw sensor data corresponding to the movement of the first wearable item.

4. An apparatus for controlling a device, comprising:
   a receiver configured to receive first and second signals from first and second wearable items, wherein the first and second signals comprise information indicating movements of the first and second wearable devices, respectively;
   a processing system configured to:
      determine that the movement of the first wearable item was intended for one or more commands and the movement of the second wearable item was not intended for any command based on the first and second signals indicating that the movements of the first and second wearable items occurred at the same time and in substantially the same direction;
      dynamically select a set of mappings defining how a gesture made by the movement of the first wearable item will be interpreted as the one or more commands;
      determine whether the gesture has a mapping in the set of mappings;
      translate the gesture into the one or more commands for the device based on the determination; and
      send an acknowledgement to the first wearable item, wherein the acknowledgment indicates a successful detection of the gesture, and wherein the acknowledgement is configured to initiate a feedback response at the first wearable item.

5. The apparatus of claim 4, wherein the dynamic selection of the set of mappings is based on an application context.

6. The apparatus of claim 4, wherein the first signal comprises raw sensor data corresponding to the movement of the first wearable item.

7. An apparatus for controlling a device, comprising:
 means for receiving first and second signals from first and second wearable items, wherein the first and second signals comprise information indicating movements of the first and second wearable items, respectively;
 means for determining that the movement of the first wearable item was intended for one or more commands and the movement of the second wearable item was not intended for any command based on the first and second signals indicating that the movements of the first and second wearable items occurred at the same time and in substantially the same direction;
 means for dynamically selecting a set of mappings defining how a gesture made by the movement of the first wearable item will be interpreted the as one or more commands;
 means for determining whether the gesture has a mapping in the set of mappings;
 means for translating the gesture into the one or more commands for the device based on the determination; and
 means for transmitting an acknowledgement to the first wearable item, wherein the acknowledgment indicates a successful detection of the gesture, and wherein the acknowledgement is configured to initiate a feedback response at the first wearable item.

8. The apparatus of claim 7, wherein the dynamic selection of the set of mappings is based on an application context.

9. The apparatus of claim 7, wherein the first signal comprises raw sensor data corresponding to the movement of the first wearable item.

10. A computer-program product for controlling a device, comprising a computer-readable storage device comprising instructions executable by a processor to:
 receive first and second signals from first and second wearable items, wherein the first and second signals comprise information indicating movements of the first and second wearable items, respectively;
 determine that the movement of the first wearable item was intended for one or more commands and the movement of the second wearable item was not intended for any command based on the first and second signals indicating that the movements of the first and second wearable items occurred at the same time and in substantially the same direction;
 dynamically select a set of mappings defining how a gesture made by the movement of the first wearable item will be interpreted as the one or more commands;
 determine whether the gesture has a mapping in the set of mappings;
 translate the gesture into the one or more commands for the device based on the determination; and
 transmit an acknowledgement to the first wearable item, wherein the acknowledgment indicates a successful detection of the gesture, and wherein the acknowledgement is configured to initiate a feedback response at the first wearable item.

11. A watch for controlling a device, comprising:
 a receiver configured to receive first and second signals from first and second wearable items, wherein the first and second signals comprise information indicating movements of the first and second wearable items, respectively; and
 a processing system configured to:
  determine that the movement of the first wearable item was intended for the one or more commands and the movement of the second wearable item was not intended for any command based on the first and second signals indicating that the movements of the first and second wearable items occurred at the same time and in substantially the same direction;
  dynamically select a set of mappings defining how the gesture will be interpreted as the one or more commands;
  determine whether the gesture has a mapping in the set of mappings;
  translate the gesture into the one or more commands for the device based on the determination; and
  transmit an acknowledgement to the first wearable item, wherein the acknowledgment indicates a successful detection of the gesture, and wherein the acknowledgement is configured to initiate a feedback response at the first wearable item.

12. A method of interpreting movements of a first wearable item as gestures associated with a command to control a controlled device, comprising:
 receiving first and second signals respectively from the first wearable item and a second wearable item, wherein the first and second signals comprise information indicating movements of the first and second wearable items, respectively;
 identifying that the movement of the first wearable item was intended for the command and the movement of the second wearable item was not intended for any command based on the first and second signals indicating that the movements of the first and second wearable items occurred at the same time and in substantially the same direction;
 determining a first context in which the movement of the first wearable item is sensed, wherein the determination is based on a set of previously configured applicable contexts by another movement of the second wearable device or another wearable item; and
 interpreting the movement of the first wearable item as being indicative of a gesture relating to the command based on the first context.

13. The method of claim 12, wherein the movement of the first wearable item comprises at least one of sliding, rotating, tilting, flexing, or tapping.

14. The method of claim 12, wherein the first context comprises at least one of a location, an application, a time, or an environment.

15. The method of claim 12, wherein the determination is based on an operational state of the first wearable item.

16. The method of claim 12, wherein the determination is based on an application context of the first wearable item, and the application context is selected by the first wearable item or the controlled device based on direct user actions or implicit conditions.

17. The method of claim 12, wherein the first context in which the movement is sensed is used to interpret data sensed by multiple sensors within the first wearable item or multiple sensors embedded in the first and second wearable items.

18. The method of claim 12, wherein the first context in which the movement is sensed is used to interpret data received from multiple sensors embedded in the first wearable item.

19. The method of claim 12, wherein the first context in which the movement of the first wearable item is sensed is used to initiate gesture detection.

20. The method of claim 12, wherein the first context in which the movement of the first wearable item is sensed is used to determine whether any step of the process to perform gesture detection needs to be initiated.

21. The method of claim 18, further comprising
 receiving data from multiple sensors; and
 prioritizing the data based on the first context to aid in interpretation of the data.

22. An apparatus for interpreting movements of a first wearable item as gestures associated with a command to control a controlled device, comprising:
- a receiver configured to receive first and second signals respectively from the first wearable item and a second wearable item, wherein the first and second signals comprise information indicating movements of the first and second wearable items, respectively; and
- a processing system configured to:
  - identify that the movement of the first wearable item was intended for the command and the movement of the second wearable item was not intended for any command based on the first and second signals indicating that the movements of the first and second wearable items occurred at the same time and in substantially the same direction;
  - determine a first context in which the movement of the first wearable item is sensed, wherein the determination is based on a set of previously configured applicable contexts by another movement of the second wearable device or another wearable item; and
  - interpret the movement of the first wearable item as being indicative of a gesture relating to the command based on the first context.

23. The apparatus of claim 22, wherein the movement of the first wearable item comprises at least one of sliding, rotating, tilting, flexing, or tapping.

24. The apparatus of claim 22, wherein the first context comprises at least one of a location, an application, a time, or an environment.

25. The apparatus of claim 22, wherein the determination is based on an operational state of the first wearable item.

26. The apparatus of claim 22, wherein the determination is based on an application context of the first wearable item, and the application context is selected by the first wearable item or the controlled device based on direct user actions or implicit conditions.

27. The apparatus of claim 22, wherein the first context in which the movement is sensed is used to interpret data sensed by multiple sensors within the first wearable item or multiple sensors embedded in the first and second wearable items.

28. The apparatus of claim 22, wherein the first context in which the movement is sensed is used to interpret data received from multiple sensors embedded in the first wearable item.

29. The apparatus of claim 22, wherein the first context in which the movement of the first wearable item is sensed is used to initiate gesture detection.

30. The apparatus of claim 22, wherein the first context in which the movement of the first wearable item is sensed is used to determine whether any step of the process to perform gesture detection needs to be initiated.

31. The apparatus of claim 22, wherein the processing system is further configured to:
- receive data from multiple sensors; and
- prioritize the data based on the first context to aid in interpretation of the data.

32. An apparatus for interpreting movements of a first wearable item as gestures associated with a command to control a controlled device, comprising:
- means for receiving first and second signals respectively from the first wearable item and a second wearable item, wherein the first and second signals comprise information indicating movements of the first and second wearable items, respectively;
- means for identifying that the movement of the first wearable item was intended for the command and the movement of the second wearable item was not intended for any command based on the first and second signals indicating that the movements of the first and second wearable items occurred at the same time and in substantially the same direction;
- means for determining a first context in which the movement of the first wearable item is sensed, wherein the determination is based on a set of previously configured applicable contexts by another movement of the second wearable device or another wearable item; and
- means for interpreting the movement as being indicative of a gesture relating to the command based on the first context.

33. The apparatus of claim 32, wherein the movement of the first wearable item comprises at least one of sliding, rotating, tilting, flexing, or tapping.

34. The apparatus of claim 32, wherein the first context comprises at least one of a location, an application, a time, or an environment.

35. The apparatus of claim 32, wherein the determination is based on an operational state of the first wearable item.

36. The apparatus of claim 32, wherein determination is based on an application context of the first wearable item, and the application context is selected by the first wearable item or the controlled device based on direct user actions or implicit conditions.

37. The apparatus of claim 32, wherein the first context in which the movement is sensed is used to interpret data sensed by multiple sensors within the first wearable item or multiple sensors embedded in the first and second wearable items.

38. The apparatus of claim 32, wherein the first context in which the movement is sensed is used to interpret data received from multiple sensors embedded in the first wearable item.

39. The apparatus of claim 32, wherein the first context in which the movement of the first wearable item is sensed is used to initiate gesture detection.

40. The apparatus of claim 32, wherein the first context in which the movement of the first wearable item is sensed is used to determine whether any step of the process to perform gesture detection needs to be initiated.

41. The apparatus of claim 32, further comprising:
- means for receiving data from multiple sensors; and
- means for prioritizing the data based on the first context to aid in interpretation of the data.

42. A computer-program product for interpreting movements of a first wearable item as gestures associated with a command, comprising a computer-readable storage device comprising instructions executable by a processor to:
- receive first and second signals respectively from the first wearable item and a second wearable item, wherein the first and second signals comprise information indicating movements of the first and second wearable items, respectively;
- identify that the movement of the first wearable item was intended for the command and the movement of the second wearable item was not intended for any command based on the first and second signals indicating that the movements of the first and second wearable items occurred at the same time and in substantially the same direction;
- determine a first context in which the movement of the first wearable item is sensed, wherein the determination is based on a set of previously configured applicable contexts by another movement of the second wearable device or another wearable item; and
- interpret the movement of the first wearable item as being indicative of a gesture relating to a command to control a controlled device based on the first context.

43. A watch comprising:
- a receiver configured to receive first and second signals respectively from first and second wearable items, wherein the first and second signals comprise information indicating movements of the first and second wearable items, respectively;
a processing system configured to:
   identify that the movement of the first wearable item was intended for the command and the second wearable item was not intended for any command based on the first and second signals indicating that the movements of the first and second wearable items occurred at the same time and in substantially the same direction;
   determine a first context in which the movement of the first wearable item is sensed, wherein the determination is based on a set of previously configured applicable contexts by another movement of the second wearable device or another wearable item; and
   interpret the movement of the first wearable item as being indicative of a gesture relating to a command to control a controlled device based on the first context; and
a transmitter coupled to the processing system and configured to transmit the command.

* * * * *